(12) United States Patent
Yeung et al.

(10) Patent No.: US 11,070,432 B2
(45) Date of Patent: Jul. 20, 2021

(54) DYNAMIC AND CUSTOMIZABLE VIRTUAL NETWORK FUNCTIONS

(71) Applicant: Cisco Technology, Inc., San Jose, CA (US)

(72) Inventors: Michael Yeung, Ontario (CA); Elie El Ajaltouni, Ontario (CA); Andrew Phillips, Dubai (AE); Peter Andersen, Ontario (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 308 days.

(21) Appl. No.: 15/655,607

(22) Filed: Jul. 20, 2017

(65) Prior Publication Data

US 2019/0028350 A1 Jan. 24, 2019

(51) Int. Cl.
*H04L 12/24* (2006.01)
*H04L 9/08* (2006.01)
*H04L 12/26* (2006.01)

(52) U.S. Cl.
CPC ........ *H04L 41/0893* (2013.01); *H04L 9/0861* (2013.01); *H04L 9/0894* (2013.01); *H04L 41/0813* (2013.01); *H04L 43/0817* (2013.01); *H04L 43/14* (2013.01)

(58) Field of Classification Search
CPC .................................................. H04L 41/0816
See application file for complete search history.

(56) References Cited

U.S. PATENT DOCUMENTS

| | | | | |
|---|---|---|---|---|
| 8,572,605 | B1* | 10/2013 | Tene | G06F 9/5077 718/1 |
| 10,419,530 | B2* | 9/2019 | Halpern | G06F 9/5061 |
| 10,432,736 | B2* | 10/2019 | Qiu | H04L 67/10 |
| 2016/0062746 | A1* | 3/2016 | Chiosi | G06F 8/35 717/104 |
| 2016/0140343 | A1* | 5/2016 | Novak | G06F 21/575 713/2 |
| 2016/0294643 | A1* | 10/2016 | Kim | H04L 67/16 |
| 2017/0104609 | A1* | 4/2017 | McNamee | H04L 12/1407 |
| 2017/0142206 | A1* | 5/2017 | Kodaypak | H04L 12/1407 |
| 2017/0187572 | A1* | 6/2017 | Wu | H04L 29/08 |
| 2017/0244614 | A1* | 8/2017 | Wu | H04L 41/0631 |
| 2018/0176088 | A1* | 6/2018 | Ellappan | H04L 41/0893 |
| 2019/0052549 | A1* | 2/2019 | Duggal | H04L 41/5045 |
| 2019/0056975 | A1* | 2/2019 | Yu | H04L 41/044 |
| 2019/0132211 | A1* | 5/2019 | Yeung | H04L 41/0896 |
| 2019/0273635 | A1* | 9/2019 | McNamee | H04L 12/1407 |
| 2019/0273668 | A1* | 9/2019 | Xia | H04L 41/0823 |
| 2019/0334777 | A1* | 10/2019 | Chou | G06F 9/45558 |

* cited by examiner

*Primary Examiner* — Douglas B Blair
(74) *Attorney, Agent, or Firm* — Polsinelli PC

(57) ABSTRACT

A network function virtualization (NFV) platform can support virtual network functions (VNFs) whose behavior can change during their lifecycles. For example, a VNF manager of the NFV platform can receive a request to update a condition of a VNF and/or an action to perform upon satisfaction of the condition. Based on the condition and action, the VNF manager can create or store a lifecycle management policy in an extensible lifecycle management model associated with the virtual network function. Based on the lifecycle management policy, the VNF manager can monitor the virtual network function to detect satisfaction of the condition and, in response to detecting satisfaction of the condition, the VNF manager can perform the action associated with the lifecycle management policy.

20 Claims, 8 Drawing Sheets

DYNAMIC AND CUSTOMIZABLE VIRTUAL NETWORK FUNCTIONS

TECHNICAL FIELD

The subject matter of this disclosure relates in general to the field of network function virtualization, and more specifically to techniques for dynamic and customizable actions for virtual network function lifecycle events and conditions.

BACKGROUND

Network function virtualization (NFV) can offer network operators a variety of benefits when managing and provisioning network services. For example, a network operator can increase utilization of computing infrastructure (e.g., computing, storage, and network resources) and decrease consumption of other resources (e.g., power, physical space, cooling, site-to-site management, etc.) by virtualizing network functions. The network operator can run software that performs specific network functions (i.e., virtual network functions (VNFs)) on commodity hardware or commercial-off-the-shelf (COTS) hardware (i.e., general purpose servers and storage devices, etc.). This can reduce the number of hardware devices in a network and different geographic locations that are serviced by certain physical network appliances. Unfortunately, current NFV platforms are inflexible and provide limited lifecycle management without significant automation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
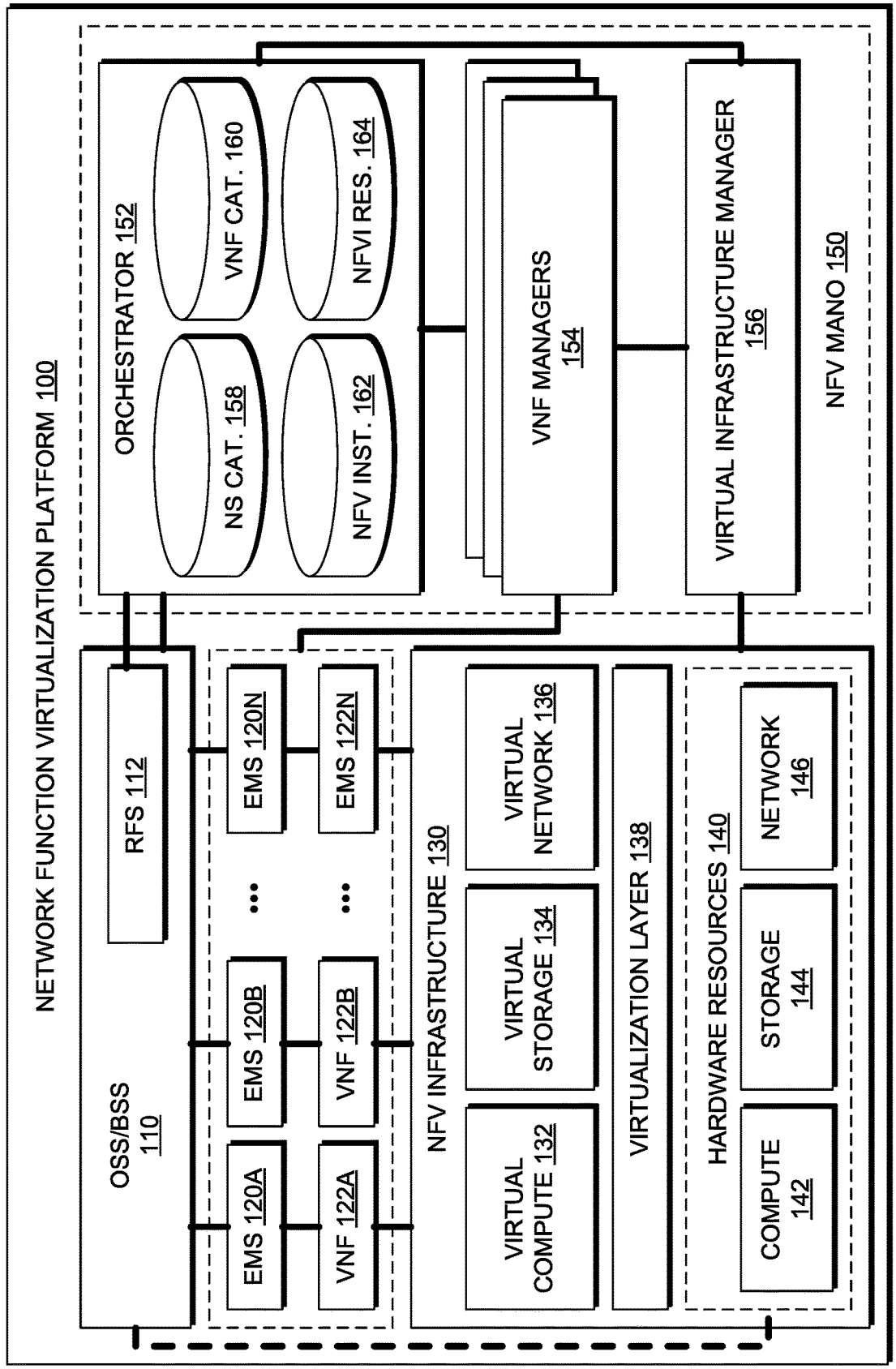
FIG. 1 illustrates an example of a network function virtualization platform in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A network function virtualization (NFV) platform can support virtual network functions (VNFs) in a network as well as VNF lifecycle changes and events. For example, a VNF manager of the NFV platform can receive a request to update one or more conditions of a VNF and/or one or more actions to perform for the VNF upon satisfaction of the condition(s). Based on the condition and action, the VNF manager can create or store a lifecycle management policy in an extensible lifecycle management model associated with the VNF. Based on the lifecycle management policy, the VNF manager can also monitor the VNF to detect satisfaction of the condition and, in response to detecting satisfaction of the condition, the VNF manager can perform the action associated with the lifecycle management policy.

Moreover, while the VNF is alive or running, the VNF manager can update a resource of the VNF to include the new condition(s) and/or action(s). For instance, the VNF manager can create a new storage volume that includes the new condition(s) and/or action(s), attach the new storage volume to the VNF, and detach a previous storage volume. The VNF manager can also write the new condition(s) and/or action(s). The VNF manager can monitor the VNF as a matter of course, detect certain condition(s), and perform specific action(s) associated with such condition(s).

Description

To support NFV in a network, the network can include a management and orchestration (MANO) system that can assemble, recombine, and manage elements of a virtualized environment in an automated manner. The European Telecommunications Institute (ETSI) Industry Specification Groups (ISG) includes an NFV MANO working group that defines a high-level functional architectural framework for NFV management and orchestration system for facilitating development of standardized and open interfaces between VNFs and their associated computing infrastructure and to promote interoperability among different vendors.

FIG. 1 illustrates a block diagram representing NFV platform 100. One of ordinary skill in the art will understand that, for NFV platform 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not necessarily depart from the scope of the present disclosure.

In this example, NFV platform 100 includes several components or functional blocks that can provide an NFV MANO architectural framework, including operations support system (OSS)/business support system (BSS) 110; element management system (EMSs) 120A, 120B, . . . , 120N (collectively, "120"); VNFs 122A, 122B, . . . , and 122N (collectively, "122"); NFV infrastructure (NFVI) 130; and NFV MANO system 150. OSS/BSS 110 can include a collection of systems and management applications that a network operator uses to run its business. In some embodiments, OSS/BSS 110 may provide for management and orchestration of legacy systems and may have full end-to-end visibility of services provided by legacy network functions in the network. In some embodiments, OSS/BSS 110 can include one or more resource-facing services (RFS) 112 that can operate as an interface between the network operator's product offerings or customer-facing services (CFS) and lower-level network resources (e.g., network service (NS) catalog 148, VNF catalog 150, NFV instances repository 152, NFVI resources respoitory 154, etc.).

EMSs 120 can include systems and applications for managing network elements. EMSs 120 can provide for fault management for network functions performed by VNFs 122, configuration for the network functions performed by VNFs 122, accounting for the usage of VNF functions, performance measurement for the functions of VNFs 122, and security management for the VNF functions (i.e., FCAPS).

VNFs 122 are virtualized implementations of physical network functions (PNFs), such as network address translators (NATs), firewalls, distributed denial of service (DDoS) mitigators, load balancers, intrusion prevent systems (IPSs), intrusion detection systems (IDSs), wide area network (WAN) optimizers, etc. In some cases, a VNF can include multiple internal components. For example, a single VNF can be made of multiple virtual instances (i.e., virtual machines (VMs), containers, or other virtual partitions of one or more computing devices (collectively, "virtual infrastructure")) in which each virtual instance hosts an individual component of the VNF. In some cases, a VNF can be a single virtual instance. A network operator can chain multiple VNFs 122 (and sometimes PNFs (not shown)) to create a network service.

NFVI 130 includes hardware and software components that make up the environment for the deployment, management, and execution of VNFs 122. In some cases, NFVI 130 can span across several geographic locations (sometimes referred to as NFVI points of presence (PoPs)). From a VNF's perspective, NFVI 130 can appear to be a black box for providing the VNF with specified resources as there can be numerous possible implementations for NFVI 130. In this example, NFVI 130 is a collection of virtualized resources, including virtual computing resources 132, virtual storage resources 134, and virtual network resources 136; virtualization layer 138; and hardware resources 140, including physical computing resources 142, physical storage resources 144, and physical network resources 146.

There are various approaches for implementing NFVI 130, and particularly virtual computing resources 132. Example approaches can include hypervisor-based virtualization, container-based virtualization, and a hybrid of hypervisor-based virtualization and container-based virtualization, among others. In hypervisor-based virtualization, software emulates the hardware of a physical computing device so that an entire, unmodified operating system can run within the emulated or virtual environment (i.e., a VM). A physical server can run one or more VMs at once, and a hypervisor or virtual machine monitor (VMM) can manage the VMs and allocate the resources of the server among them. Hypervisors can run as hosted software within a conventional operating system, or run on "bare metal" or directly on physical hardware. In container-based virtualization, software provides self-contained execution environments (i.e., containers) that rely on the same operating system kernel. A container engine isolates applications executing within each environment, such as by using different namespaces for each environment or container. An example of a hybrid implementation can involve using a hypervisor (hosted or bare-metal) on some servers of a network and a container engine on other servers of the network. Virtual computing resources 132 can thus include one or more VMs, one or more containers, and/or one or more other virtual partitions. In some embodiments, however, VNFs 122 can also run on non-virtualized servers as applications hosted by an operating system or as bare metal applications.

Virtual storage resources 134 can include block storage resources, file storage resources, and the like. In block virtualization, a network operator abstracts logical storage from physical storage such that data is accessible without regard to physical storage or heterogeneous structure. In file virtualization, the network operator eliminates dependencies between the data accessed at the file level and the physical location of the files. Block data or files may physically reside on the hard disk drives (HDD), solid state drives (SSD), or other type of media of a multitude of physical servers. Clients, however, can access a set of associated blocks or files from a single logical location that maps to physical locations.

Virtualization layer 138 can abstract and logically partition hardware resources 140 to decouple VNF software from the underlying hardware. This can facilitate deployment of VNFs 122 using different types of hardware, such as physical devices having central processing units (CPUs) based on the reduced instruction set computer (RISC) architecture (e.g., Advanced RISC Machine (ARM) architecture); the Microprocessor without Interlocked Pipeline Stages (MIPS) architecture; the Power architecture; Scalable Processor Architecture (SPARC); or the complex instruction set computer (CISC) architecture (e.g., the x86 architecture) or physical devices having architectures that include a Front-Side Bus (FSB), Dual Independent Buses (DIB), Dedicated High-Speed Interconnects (DHSI), Intel QuickPath Interconnects (QPI), etc. Virtualization layer 138 enables VNF software to use the underlying virtualized infrastructure, and can also operate as an interface to provide virtualized resources to VNFs 122. Virtualization layer 138 can include hypervisors, containers, hardware abstraction layers (HAL), hardware drivers, or other intermediary software between virtual computing resources 132, virtual storage resources 134, and virtual network resources 136 and hardware resources 140 for providing interoperability between VNFs 122 and hardware resources 140.

In configurations that implement virtualization in the network domain, virtualization layer 138 can abstract network hardware to realize virtualized network paths that provide connectivity between virtual instances of a VNF and/or between different VNFs. Several techniques allow this, including network abstraction layers that isolate resources via virtual networks and network overlays, including Virtual Local Area Network (VLAN), Virtual Private LAN Service (VPLS), Virtual Extensible Local Area Network (VxLAN), Network Virtualization using Generic Routing Encapsulation (NVGRE), etc. Other possible forms of virtualization of the transport network include centralizing the control plane of the transport network and separating it from the forwarding plane and isolating the transport medium (e.g., in optical wavelengths, etc.).

Hardware resources 140 include computing resources 142, storage resources 144, and network resources 146 that provide processing, storage and connectivity to VNFs 122 through virtualization layer 138. Hardware resources 140 are typically "commodity" devices or commercial-off-the-shelf (COTS) hardware but some embodiments may utilize some purpose-built hardware for certain functionality. Computing resources 142 can include physical servers having a variety of CPUs, architectures, memory capacity, types of memory, etc. Storage resources 144 can include shared network attached storage (NAS) and/or storage that resides on a commodity or COTS server. In some embodiments, a network operator may pool computing resources 142 and storage resources 144. Network resources 144 can include devices that provide switching functions (e.g., switches, routers, and wired or wireless links).

NFV MANO system 150 manages NFVI 130 and orchestrates the allocation of resources needed by VNFs 122 and network services (i.e., chains of VNFs 112 that may also include PNFs). In this example, NFV MANO system 150 includes orchestrator 152, VNF managers 154, and virtual infrastructure manager (VIM) 156 for management and orchestration of NFVI 130, VNFs 122, and network services; fault and performance management of network services and VNFs 122; policy management; and testing of network services and VNFs 122.

Orchestrator 152 is generally responsible for orchestration of the resources of NFVI 130 across multiple VIMs 156, and lifecycle management of network services. Tasks for management and orchestration of NFVI resources can include providing VNFs 122 with the resources they need and provisioning connectivity to PNFs when a network service includes a PNF that needs to connect to a VNF or when a network service spans multiple NFVI-PoPs. Orchestrator 152 is also responsible for network service lifecycle management, including operations for on-boarding a network service (i.e., registering a network service in network service catalog 158 and ensuring that orchestrator 152 can access templates required by the network service, including VNF templates stored in VNF catalog 160 and NFVI templates stored in NFVI resource repository 164); instantiating a network service; scaling a network service; updating and/or upgrading a network service; creating, deleting, querying, and updating VNF forwarding graphs associated with a network service; and terminating network services (i.e., requesting for the termination of constituent VNF instances, requesting for the release of NFVI resources associated with a network service, and returning them to NFVI 130). An example of an implementation of orchestrator 152 is Cisco® Network Service Orchestrator (NSO).

Data repositories for supporting the operations of NFV MANO 150 can include network service catalog 158, VNF catalog 160, NFV instances repository 162, and NFVI resources repository 164 for performing its various operations. Network service catalog 158 can store information for on-boarded network services, including network service deployment templates (sometimes referred to as network service descriptors (NSDs)), virtual link descriptors (VLDs), and VNF forwarding graph descriptors (VNFFGDs).

VNF catalog 160 can store information for on-boarded VNFs, including VNF deployment templates (sometimes referred to as VNF Descriptors (VNFD)), software images, manifest files, etc.). In some embodiments, orchestrator 152 and VNF managers 154 can query VNF catalog 160 for finding and retrieving a VNFD, validating a VNF, and checking instantiation feasibility.

NFVI instances repository 162 can store information for instantiated VNF and network service instances. A VNF record can store information for a particular running VNF instance, and a network service record can store information for a particular running network service instance. Various components of NFV MANO 150 can update these records during the lifecycles of the respective instances to represent changes resulting from execution of NS lifecycle management operations and/or VNF lifecycle management operations.

NFVI resources repository 164 can store information for reserving, allocating, and monitoring the resources of NVFI 130. In some cases, VIM 156 can provide an interface for orchestrator 152 and VNF managers 154 to accessing these functions.

VNF managers 154 can manage lifecycles of VNFs 122, including operations such as instantiating, scaling (i.e., increasing or reducing the number of VNF instances for a particular network function), updating and/or upgrading, and terminating VNFs 122. VNF managers 154 can also perform VNF instantiation feasibility checking, VNF instance-related collection of NFVI performance measurement results and faults/events information, VNF instance assisted or automated healing, VNF lifecycle management change notification, management of the integrity of VNFs 122 through their lifecycles. An individual VNF manager can serve a single VNF or multiple VNFs.

VIM 156 is responsible for resource management, including maintaining inventory of the resources of NFVI 130 (i.e., virtual computing resources 132, virtual storage resources 134, virtual network resources 136, virtualization layer 138, computing resources 142, storage resources 144, network resources 146, etc.); allocation of virtualization resources (e.g., invoking hypervisors to instantiate VMs, invoking container engines to instantiate containers, reserving servers and storage servers/devices, establishing network connectivity, etc.); managing infrastructure resource and allocation (e.g., increasing resources to virtual instances, improving energy efficiency, and reclaiming resources, etc.). VIM 156 can also provide for visibility into and management of NFVI 130, root cause analysis of performance issues of NFVI 130, collection of infrastructure fault information, and collection of information for capacity planning, monitoring, and optimization.

Figure 2:
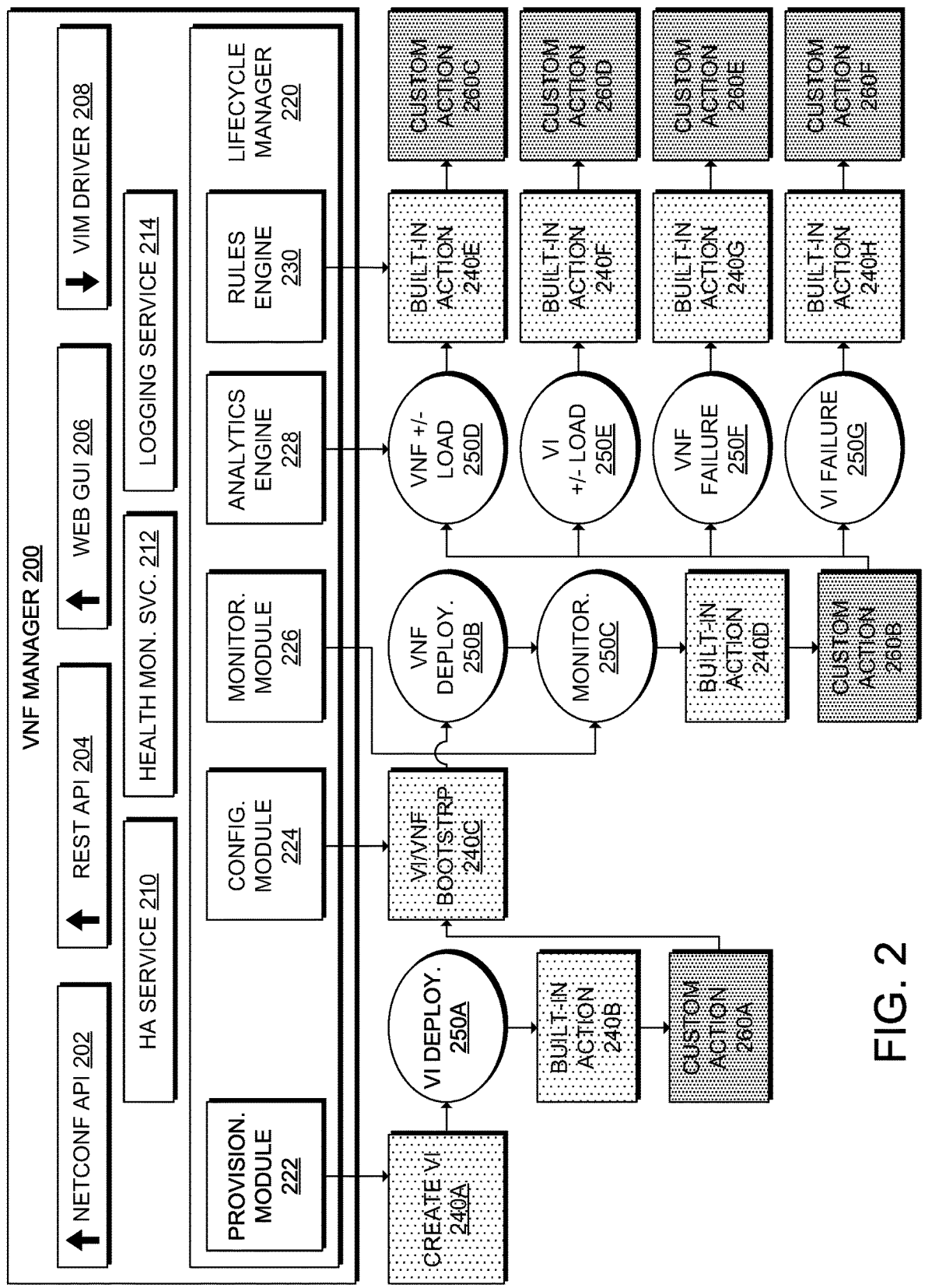
FIG. 2 illustrates an example of a virtual network function manager in accordance with various embodiments.

FIG. 2 illustrates a block diagram representing VNF manager 200, which can be an example of an implementation of VNF manager 154. In this example, VNF manager 200 includes various interfaces for supporting "northbound" (from the perspective of VNF manager 200) interactions, including NETCONF/YANG application programming interface (API) 202, restful state transfer (REST) API 204, and web graphical user interface (GUI) 206; interfaces for providing "southbound" (from the perspective of VNF manager 200) interactions, including VIM driver 208; services, including high availability (HA) service 210, health monitoring service 212, and logging service 214; and lifecycle manager 220.

NETCONF is a network management protocol to install, manipulate, operate, and delete the configuration of network devices. In some cases, an orchestrator (e.g., orchestrator 152) can communicate with VNF manager 200 using open NETCONF protocol and YANG based data models. In this manner, VNF manager 200 can manage VNFs (e.g., VNFs 122) at a device level, and the orchestrator can manage the entire network service lifecycle. Together, the orchestrator and VNF manager can provide a complete orchestration solution that spans across both physical and virtual infrastructure. In some cases, along with NETCONF notifications, NETCONF/YANG API 202 can also provide operational data, such as a list of all tenants, networks, and deployments in VNF manager 200.

Table 1 provides an example of a NETCONF request to create a tenant, and Table 2 provides an example of a NETCONF notification after VNF manager 200 successfully creates a tenant.

TABLE 1

Example of a NETCONF request to create a tenant.

```
1:  <rpc message-id="1"
    xmlns="urn:ietf:params:xml:ns:netconf:base:1.0">
2:      <edit-config>
3:          <source>
4:              <running/>
5:          </source>
6:          <config>
```

TABLE 1-continued

Example of a NETCONF request to create a tenant.

```
7:              <esc__datamodel
                    xmlns="http://www.cisco.com/esc/esc">
8:                  <tenants>
9:                      <tenant>
10:                         <name>mytenant</name>
11:                     </tenant>
12:                 </tenants>
13:             </esc__datamodel>
14:         </config>
15:     </edit-config>
16: </rpc>
```

TABLE 2

Example of a NETCONF notification indicating successful creation of a tenant.

```
1:  <notification xmlns="urn:ietf:params:xml:ns:netconf:notification:1.0">
2:      <eventTime>2015-05-05T19:38:27.71+00:00</eventTime>
3:      <escEvent xmlns="http://www.cisco.com/esc/esc">
4:          <status>SUCCESS</status>
5:          <status_message>Tenant successfully
                created</status_message>
6:          <tenant>mytenant</tenant>
7:          <vm_source/>
8:          <vm_target/>
9:          <event>
10:             <type>CREATE_TENANT</type>
11:         </event>
12:     </escEvent>
13: </notification>
```

REST API 204 is a programmatic interface to VNF manager 200 that uses a representational state transfer (REST) architecture. REST API 204 accepts and returns Hypertext Transfer Protocol (HTTP) or HTTP Secure (HTTPS) messages that contain JavaScript Object Notation (JSON) or Extensible Markup Language (XML) documents. An NFV platform (e.g., NFV platform 100) can use any programming language to generate the messages and the JSON or XML documents that contain the API methods or managed object (MO) descriptions. REST API 204 can include classes (i.e., templates that define the properties and states of objects in the management information tree (MIT)); methods (i.e., actions that REST API 204 performs on one or more objects); and types (i.e., object properties that map values to the object state). In some cases, REST API 204 can receive a request and place the request in a transactor queue in first in, first out (FIFO) order. The transactor can retrieve the request from the queue, interpret the request, and perform an authorization check. After confirmation of the request, the transactor can update the MIT. REST API 204 can complete these operations in a single transaction.

Table 3 provides an example of a REST request to create a tenant, and Table 4 provides an example of a REST response after VNF manager 200 successfully creates a tenant.

TABLE 3

Example of a REST request to create a tenant.

```
1:  POST /v0/tenants/123 HTTP/1.1
2:  Host: client.host.com
3:  Content-Type: application/xml
4:  Accept: application/xml
5:  Client-Transaction-Id: 123456
6:  Callback:/createtenantcallback
```

TABLE 3-continued

Example of a REST request to create a tenant.

```
 7: <?xml version="1.0" encoding="UTF-8"?>
 8: <tenant xmlns="urn:ietf:params:xml:ns:netconf:base:1.0">
 9:   <name>xyz</name>
10:   <enabled>true</enabled>
11:   <description>A description...</description>
12: </tenant>
```

TABLE 4

Example of a REST response indicating successful creation of a tenant.

```
 1: HTTP/1.1 201 OK
 2: Content-Type: application/xml; charset=UTF-8
 3: Content-Length: 200
 4: Date: Sun, 1 Jan 2011 9:00:00 GMT
 5: ESC-Transaction-Id: 123456
 6: ESC-Status-Code: 200
 7: ESC-Status-Message: Success ...
 8: <?xml version="1.0" encoding="UTF-8"?>
 9: <tenant>
10:   <external_tenant_id>234243490854004</external_tenant_id>
11:   <internal_tenant_id>434344896854965</internal_tenant_id>
12:   <name>xyz</name>
13:   <enabled>true</enabled>
14:   <description>A description...</description>
15: </tenant>
```

Web GUI 206 is a web-based tool for an administrator to create, read, update, or delete (CRUD) operations related to VNF lifecycle management. Web GUI 206 can enable an administrator to create and view the real-time activities of VNF manager 200 such as deploying, undeploying, healing, and scaling VNFs.

VIM driver 208 is a component that enables VNF manager 200 to interface with a particular virtualization platform, such as OpenStack provided by the OpenStack Foundation of Austin, Tex. or vCenter provided by VMware Inc. of Palo Alto, Calif.

HA service 210 can prevent single point of failure and minimize shutdown time of VNF manager 200. In some cases, HA service 210 can implement a primary and standby model. If the primary VNF manager instance fails, the standby VNF manager instance can automatically take over the services provided by the primary instance. In some cases, HA service 200 can resolve single point failures due to network failures, power failures, a dead VM instance, scheduled downtime, hardware issues, and internal application failures, among other possibilities.

Health monitoring service 212 provides an interface (e.g., REST, Simple Object Access Protocol (SOAP), service oriented architecture (SOA), resource oriented architecture (ROA) API) for third party software to monitor the health of VNF manager 200 and its services. Using the API, the third party software can query the health condition of VNF manager 200 periodically to check whether VNF manager 200 is in service. In response to the query, the API can provide status code and messages. Table 5 provides an example of status codes and associated health monitoring messages.

TABLE 5

Example of health monitoring messages.

| Status Code | Message |
| --- | --- |
| 2000 | Services running. |
| 2010 | Services running but HA node is not reachable. |

TABLE 5-continued

Example of health monitoring messages.

| Status Code | Message |
| --- | --- |
| 2020 | Services running but one or more VIM services are not reachable. |
| 2030 | Services running but VIM credentials not provided. |
| 2100 | Services running but HA node is not reachable and one or more VIM services are not reachable. |
| 5010 | VNF manager service, VNF manager not running. |
| 5020 | VNF manager service, NETCONF API not running. |
| 5030 | VNF manager service, health monitoring service not running. |
| 5040 | VNF manager service, VIM manager not running. |

Logging service 214 logs messages of events throughout the lifecycle of each VNF deployed by VNF manager 200. The messages can be external messages, messages from VNF manager 200 to other external systems, error messages, warnings, events, failures, and the like. Logging service 214 can support classifications (i.e., logging categories) and tags (i.e., custom logging categories) to facilitate search of logs. In some embodiments, VNF manager 200 can expose logging service 214 to third party software for the software to query and retrieve logs.

Lifecycle manager 220 manages the lifecycle of each VNF/VM deployed by VNF manager 200. Lifecycle manager 220 can include a number of components or engines for performing specific lifecycle management tasks. In this example, the components of lifecycle manager 220 include provisioning module 222, configuration module 224, monitoring module 226, analytics engine 228, and rules engine 230. The shaded boxes in FIG. 2 represent the tasks performed by these modules/engines, and the ellipses represent particular lifecycle stages. The lifecycle of a service can begin with a request for a new service to VNF manager 200 (e.g., via NETCONF API 202, REST API 202, Web GUI 206, etc.). Provisioning module 222 can instantiate one or more VMs, containers, or other virtual partitions (i.e., virtual infrastructure) 240A at which point the new service is in VI deployment stage 250A. The requestor can specify all of the characteristics (e.g., vCPU, memory, disk, etc.) typically associated with spinning up and managing virtual infrastructure. Lifecycle manager 220 can also perform built-in action(s) 240B (i.e., an action native to VNF manager 200 that can execute by default or by user configuration) and/or custom action(s) 260A (i.e., an action a user can predefine to override a default action or to execute in addition to a default action or other built-in action) when the virtual infrastructure initially comes online. In various embodiments, lifecycle manager 200 can perform any number of built-in actions and custom actions (including no actions) in any order (e.g., one or more custom actions followed by or more built-in actions and/or other custom actions) and/or in parallel.

In the next stage, configuration module 224 can apply "day-zero" configuration and/or perform other bootstrapping tasks 240C for a new VNF service. For example, VNF configuration module 224 can set up credentials, licensing, connectivity information (e.g., IP address, gateway), and/or other static parameters to make the new service available to the network.

After configuration and bootstrapping, the VNF service is in VNF deployment stage 250B. VNF monitoring module 226 can then track the health and performance of the VNF service in monitoring stage 250C. For example, VNF manager 200 can interface with element managers (e.g., element managers 120) and evaluate built-in service and performance-related metrics 240D (e.g., capacity, load bursts, number of concurrent sessions, etc.). VNF monitoring module 226 can also track user-defined service and performance-related metrics 260B. In some embodiments, VNF manager 200 can integrate with a VIM manager (e.g., VIM manager 156) to also monitor the health and performance of the VM(s), container(s), and/or virtual partition(s) in which the VNF service resides, including built-in metrics (e.g., CPU use, memory consumption, bandwidth, etc.) and user-defined metrics.

In various embodiments, VNF manager 200 can use agentless monitoring to track the health and performance of the VNF service and the virtual infrastructure running the VNF service. Agentless monitoring can significantly reduce service deployment by eliminating or minimizing the time and resources otherwise necessary for integration of agents, re-validation/re-certification, root-cause troubleshooting (i.e., determining whether an issue is the VNF software or the orchestrator software), etc. With an agentless mode of monitoring operations, VNF manager 200 can monitor CPU or memory use to track VNF performance and/or other user-defined metrics based on other protocols (e.g., Simple Network Management Protocol (SNMP)) or custom scripts.

In some embodiments, VNF manager 200 can scale in/scale out resources for monitoring module 226. For example, VNF manager 200 can track the load of monitoring module 226 and scale in/scale out resources to maintain a specified load for monitoring module.

Analytics engine 228 identifies problems and events that require action, and rules engine 230 defines rules and thresholds for establishing the criteria for these occurrences. Together, these engines can automate and accelerate the response of VNF manager 200 to specific conditions or events. In some embodiments, VNF manager 200 can provide a customizable environment for monitoring of specialized VNF services out of the box and specifying work flows for certain events. Analytics engine 228 and rule engine 230 can handle both simple and complex rules. For example, an administrator can define a simple rule such as advertising availability of a service to the rest of the network when the service goes live. A more complex rule could specify a set of actions to perform in response to a particular event, such as directing VNF manager 200 to automatically scale up, scale out, and notify the orchestrator when overloading of resources occurs.

In this example, analytics engine 228 can receive state information from monitoring module 226 to identify lifecycle stages such as the overloading/underloading of the resources for a VNF service 250D, overloading/underloading of virtual infrastructure 250E in which the VNF service runs, failure of the VNF service 250F, and failure of the virtual infrastructure 250G. The analytics engine can evaluate applicable rules and thresholds from rules engine 230 to trigger built-in actions 240E, 240F, 240G, and 240H, respectively, and/or custom actions 260C, 260D, 260E, and 260F, respectively. In various embodiments, VNF manager 200 can support a variety of built-in lifecycle stages or custom lifecycle stages based on other built-in conditions or custom conditions that can invoke other built-in actions and/or custom actions subject to other built-in rules and thresholds and/or custom rules and thresholds.

Figure 3:
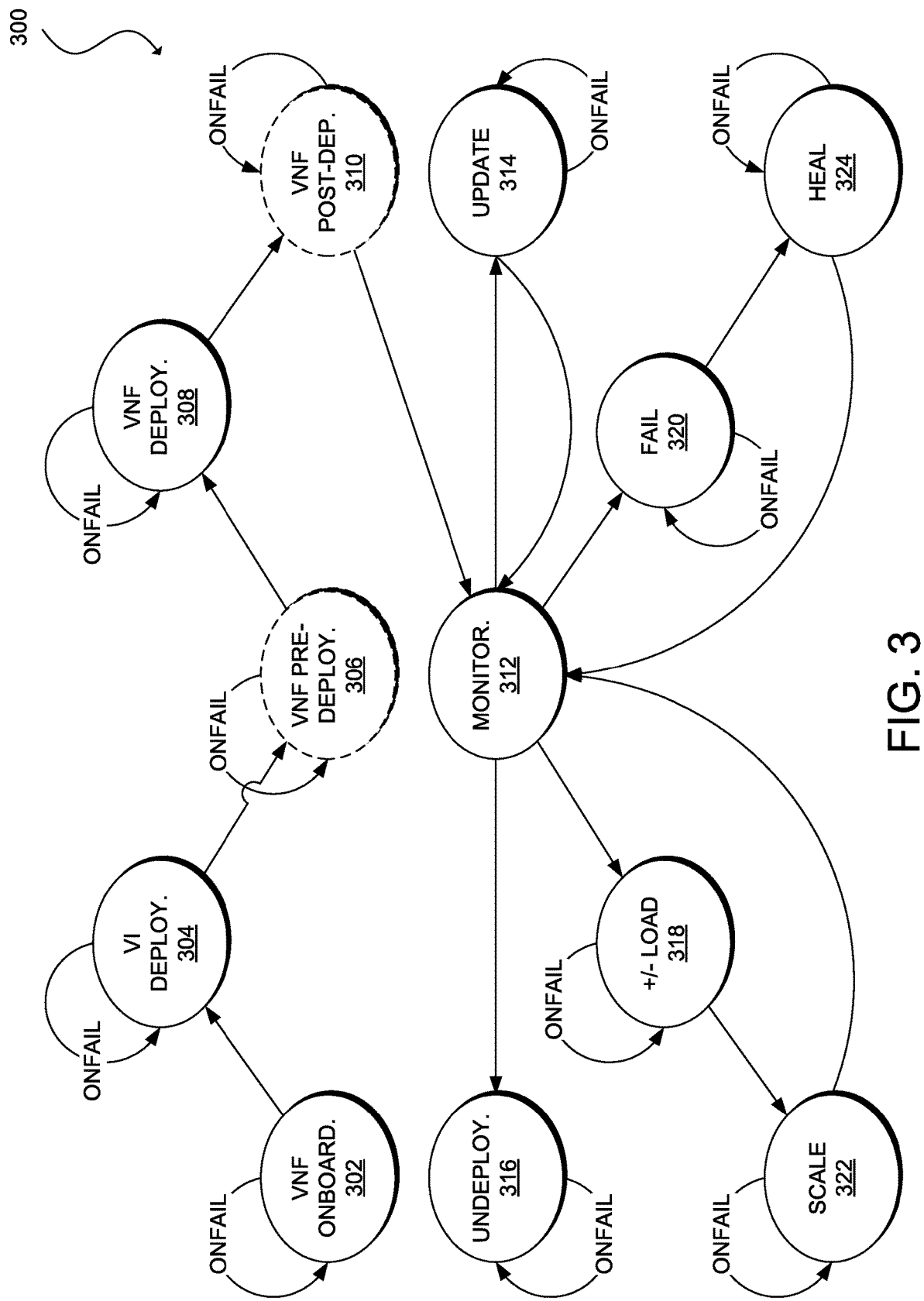
FIG. 3 illustrates an example of a lifecycle state machine for a VNF in accordance with various embodiments.

FIG. 3 illustrates an example of lifecycle state machine 300 for a VNF service and its associated VM(s), container(s), and/or other virtual partition(s). A VNF manager (e.g., VNF manager 156 or VNF manager 200), and more specifically a lifecycle manager (e.g., lifecycle manager 220) can track the health and performance of the VNF service and its underlying virtual infrastructure in accordance with lifecycle state machine 300. In this example, lifecycle state machine 300 includes VNF onboarding stage 302, VI deployment stage 304, VNF pre-deployment stage 306, VNF deployment stage 308, VNF post-deployment stage 310, monitoring stage 312, update stage 314, undeployment stage 316, overderloaded/underloaded stage 318, fail stage 320, scale stage 322, and heal stage 324. In various embodiments, a lifecycle state machine can include any number of built-in lifecycle stages and/or custom lifecycle stages and lifecycle state machine 300 is but one possible set of lifecycle stages.

FIG. 3 shows that many of the lifecycle stages of lifecycle state machine 300 exhibit very simple behavior—generally staying in the same stage on failure and transitioning to a new stage on success. This indicates that the VNF manager re-attempts one or more actions associated with a particular lifecycle stage until the action(s) complete(s) successfully. VNF onboarding stage 302, VI deployment stage 304, VNF pre-deployment stage 306, VNF deployment stage 308, VNF post-deployment stage 310, updating stage 314, overloaded/underloaded stage 318, fail stage 320, scale stage 322, and heal stage 324 behave in this manner. VNF onboarding stage 302 represents the first time the VNF manager adds a new VNF service. This stage can involve ensuring that the new VNF complies with the prerequisites defined by a VIM (e.g., VIM 156) such as by supporting certain virtual image formats (e.g., raw image format, Open Virtualization Format (ovf), QEMU copy on write (qcow) or qcow2, virtual machine disk (vmdk), etc.), a configuration drive for VNF boostrapping, or XML templates for new VNF types.

VI deployment stage 304 can occur after a request to the VNF manager for a new VNF service, upon which the VNF manager can provision the virtual resources required by the service. VNF pre-deployment stage 306, VNF deployment stage 308, and VNF post-deployment stage 310 represent different phases of the deployment of the VNF service. In VNF deployment stage 308, the VNF manager applies day zero configuration for the new VNF service, including setting up credentials, licensing, connectivity information (IP address, gateway), and other static parameters to make the new virtual resource available to the system. The VNF manager can also activate licenses for the new VNFs during VNF deployment stage 308. In this example, VNF pre-deployment stage 306 and VNF post-deployment stage 310 are custom lifecycle stages immediately preceding and following VNF deployment stage 308, respectively. In various embodiments, an administrator can generally define any custom lifecycle stage by configuring the VNF manager, an analytics engine (e.g., analytics engine 228), and/or rules engine (e.g., rule engine 230) to perform one or more specific tasks upon the occurrence of one or more conditions. In other embodiments, VNF pre-deployment stage 306 and VNF post-deployment stage 310 (and generally any other lifecycle stages) may be built-in or native.

Other lifecycle state machines may exhibit more complex behavior that include additional lifecycle stages for more robust error handling, rolling back failed actions, or transitioning to particular stages to resolve specifically identified issues. For example, in monitoring stage 312, the VNF manager can track the health of virtual infrastructure using various methodologies, such as Internet Control Message Protocol (ICMP), ping, SNMP, and the like. The VNF manager can also monitor performance metrics, such as CPU use, memory consumption, and other core parameters. The VNF manager can also provide a framework to monitor service performance-related metrics and other user-defined parameters (e.g., capacity, load bursts, number of concurrent sessions, etc.).

Under some circumstances, the VNF manager can detect the virtual infrastructure and/or the VNF service in overloaded/underloaded stage 318. This can trigger one or more scaling actions and entry into scale stage 322 to increase virtual resource utilization in the overloaded stage and decrease virtual resource utilization in the underloaded stage. Similarly, the VNF manager can detect the virtual infrastructure and/or the VNF service in fail stage 320 and invoke one or more healing actions for handling the failure of the virtual infrastructure and/or service in heal stage 324. In some embodiments, the VNF manager can utilize an analytics engine (e.g., analytics engine 228) to evaluate built-in or native key performance indicators (KPI) and/or custom metrics to define overloaded/underloaded stage 318, fail stage 320, and generally any other scenarios related to the VNF service and its underlying virtual infrastructure. The VNF manager can take specific actions defined in a rules engine (e.g., rules engine 230).

In some embodiments, the VNF manager allows deployment updates after a successful deployment. In update stage 314, the VNF manager can perform updates (e.g., adding or deleting a virtual infrastructure group, adding or deleting an ephemeral network in a virtual infrastructure group, adding or deleting an interface in a virtual infrastructure group, etc.) in a single deployment or individually. In some embodiments, the VNF manager can also support undeployment of a deployed VNF. In undeployment stage 316, the VNF manager can undeploy the VNF in response to a request from a northbound API (e.g., NETCONF API 202, REST API 204) or through another user interface (e.g., web GUI 206).

As discussed, conventional VNF managers and/or network virtualization orchestration platforms do not support live updates of virtual infrastructure and/or VNF services. If a user needs to modify the behavior of virtual infrastructure and/or a particular VNF service, the user must typically initiate a workflow for undeploying the virtual infrastructure and/or VNF, onboard the updated virtual infrastructure and/or VNF, and initiate a workflow for deploying the updated virtual infrastructure and/or VNF. These workflows can take a lengthy amount of time depending on the platform (e.g., minutes, hours, or days in some cases). While these workflows take place, the VNF is unavailable and can result in the interruption of services dependent on the VNF.

Systems and methods in accordance with various embodiments of the present disclosure may overcome one or more of the foregoing or other deficiencies experienced in conventional approaches for updating a VNF and/or its underlying virtual infrastructure. In various embodiments, a VNF manager can employ a policy-driven data model that enables customization of built-in and/or user-defined actions for the VNF manager to perform during specified lifecycle stages (native or custom) when the VNF manager determines that certain built-in and/or user-defined conditions have occurred. The VNF manager can define policies at the VNF and/or virtual infrastructure level. That is, the VNF manager can define policies for both VMs, containers, and/or other virtual partitions in addition to policies for a VNF service (including a single VNF or multiple VNFs). The policy data model can comprise conditions (i.e., lifecycle stages in a deployment) and actions (e.g., interpreted script, source code, executable file, etc.). An action can predefined, meaning that it is built-in or native to the VNF manager/network virtualization orchestration platform; or custom, meaning that it is user-defined or non-native.

A VNF manager can dynamically alter the behavior of a running or live VNF without undeploying the VNF and/or its underlying virtual structure by defining new actions and conditions and/or updating existing actions and conditions and then updating one or more database volumes associated with the VNF and/or its underlying virtual infrastructure. In some embodiments, this can involve replicating the current database volume(s) of the VNF and/or its underlying infrastructure, updating the replicated database(s) with the new and/or updated actions and conditions, detaching the current database volume(s), and attaching the updated database volume(s). In other embodiments, this can involve writing the new and/or updated actions and conditions to the current database volume(s) using structured query language (SQL) or other relational database querying language, Open Database Connectivity (ODBC) or other object-relational mapping (ORM) system, or other suitable data access techniques.

Table 6 is an example of a custom (i.e., user-defined or non-native) policy "PCRF_POST_DEPLOYMENT" defining an action for a VNF manager to perform upon the VNF manager detecting a particular condition. For instance, the condition is a lifecycle manager (e.g., lifecycle manager 220) detecting the transition of a VNF service (i.e., policy and charging function (PCRF)) to a post deployment stage "LCS::POST_DEPLOY_ALIVE" (e.g., VNF post deployment stage 310) and the action, "FINISH_PCRF_INSTALLATION," is to execute a script called "cluman_post_deployment.py" with a parameter "cluman_mgmt_address" of "10.0.0.1." That is, after deployment of the virtual infrastructure (e.g., a cluster of VMs) for the PCRF and the VNF manager determining that each VM of the cluster is reachable, the lifecycle manager invokes cluman_post_deployment.py to stitch the VMs together to provide the virtual infrastructure for the PCRF. In various embodiments, a policy can include any number of conditions or lifecycle stages, and a policy can include any number of actions and various types of actions in addition to scripts (e.g., script or source code directly inserted into the policy instead of a reference to a file name and path for a script, reference to a file name and path for an executable file, etc.).

TABLE 6

Example of a custom lifecycle stage for a PCRF.

```
 1:  <policy>
 2:      <name>PCRF_POST_DEPLOYMENT</name>
 3:      <conditions>
 4:          <condition>
 5:              <name>LCS::POST_DEPLOY_ALIVE</name>
 6:          </condition>
 7:      </conditions>
 8:      <actions>
 9:          <action>
10:              <name>FINISH_PCRF_INSTALLATION</name>
11:              <type>SCRIPT</type>
12:              <properties>
13:                  <property>
14:                      <name>script_filename</name>
15:                      <value>cluman_post_deployment.py
                        </value>
```

TABLE 6-continued

Example of a custom lifecycle stage for a PCRF.

```
16:                </property>
17:                <property>
18:                    <name>--cluman_mgmt_address</name>
19:                    <value>10.0.0.1</value>
20:                </property>
21:            </properties>
22:        </action>
23:    </actions>
24: </policy>
```

Figure 4:
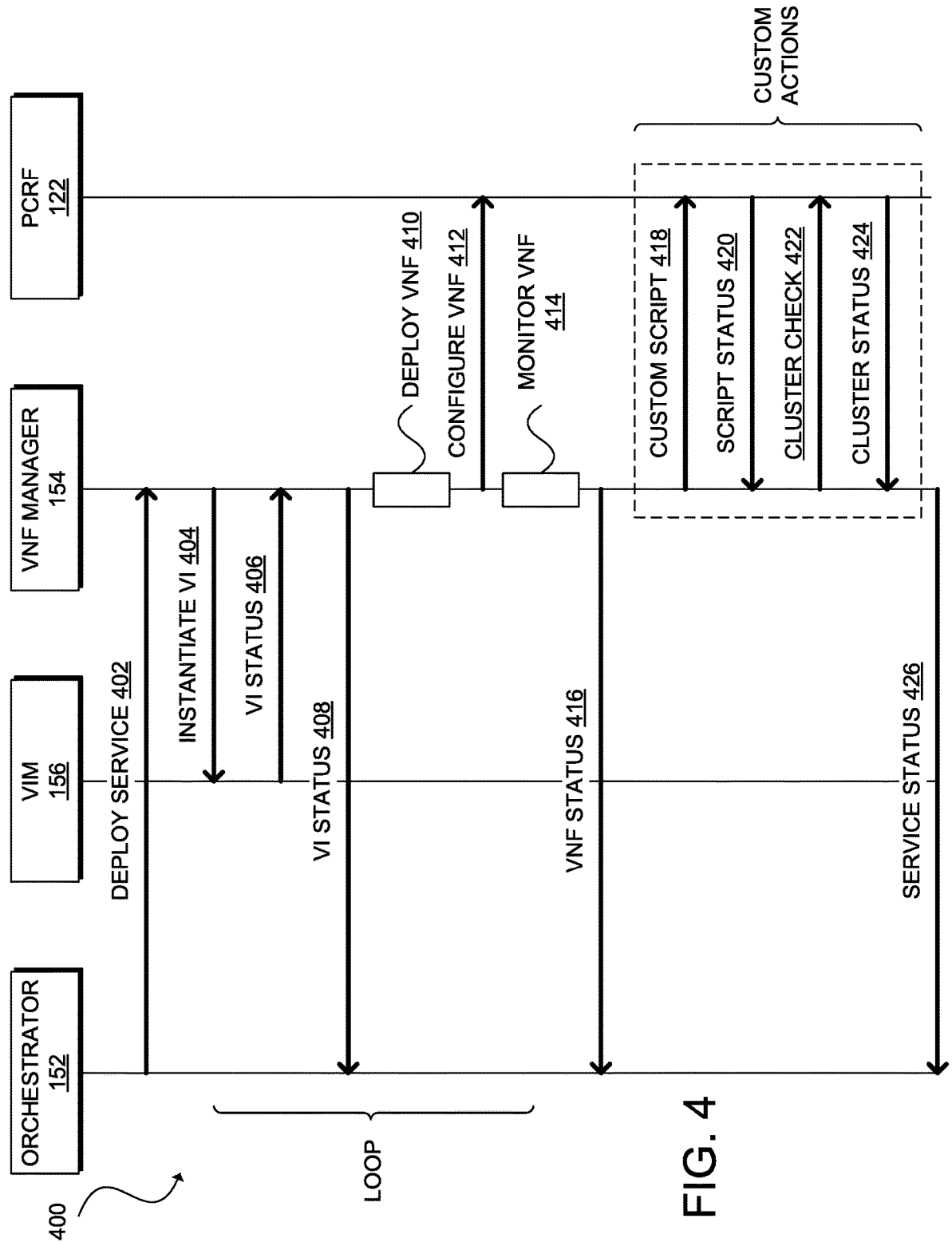
FIG. 4 illustrates an example of a sequence diagram of a process for customized orchestration of a VNF in accordance with various embodiments.

FIG. 4 illustrates an example of sequence diagram of a process 400 for customized orchestration of a PCRF. One of ordinary skill will understood that, for any process discussed herein, there can be additional, fewer, or alternative steps performed in similar or alternative orders, or in parallel, within the scope of the various embodiments unless otherwise stated. The process can occur within an NFV platform similar to NFV platform 100, including orchestrator 152, VNF manager 154, VIM 156, and PCRF 122.

Process 400 can begin with a request to orchestrator 152 for a VNF service (i.e., PCRF 122) at which point the orchestrator can request VNF manager 154 to initiate deployment of the PCRF at step 402, such as via a NETCONF API (e.g., NETCONF API 204), a REST API (e.g., REST API 204), web GUI (e.g., web GUI 206), or other suitable interface between orchestrator 152 and VNF manager 154. Part of the request can specify the number of VM, containers, and/or other virtual partitions (i.e., virtual infrastructure) needed for the service.

At step 404, VNF manager 154 can request VIM 156 to instantiate a VI instance. The request to VIM 156 can specify the parameters (e.g., vCPU, memory, disk, etc.) typically associated with spinning up and managing virtual infrastructure. At step 406, VIM 156 can report the status of provisioning the VI instance, and VNF manager 154 can forward that status to orchestrator 152 at step 408.

Process 400 can proceed to step 410 at which VNF manager 154 deploys PCRF 122 onto the instantiated VI instance. This can involve VNF manager 154 applying "day-zero" configuration and/or performing other bootstrapping tasks 412 to condition the VI instance for providing the VNF service. For example, this can include establishing set up credentials, licensing, connectivity information (e.g., IP address, gateway), and/or other static parameters to make the new service available to the network. VNF can monitor 414 the state of PCRF 122 during the deployment, and send the deployment status at 416. Steps 404-416 can repeat for each VI instance needed by the VNF service.

In this example, orchestration of PCRF 122 also includes defining a custom condition and one or more custom action(s) to perform on a live or running VNF. For example, for purposes of software maintainability, efficiency, usability, etc., an administrator may prefer stitching together a cluster of VNF nodes once they are operational rather than having software that specifically handles the case when there is only one currently available VNF or the case when a VNF fails to deploy. Thus, VNF manager 154 can include a lifecycle stage or condition for post deployment of all of the VNF nodes required for PCRF 122. Upon occurrence of this condition, VNF manager 154 performs one or more custom actions. In this example, VNF manager 154 performs a custom action—executing a custom script at 418 to stitch together the VNF nodes which PCRF 122 reports back to VNF manager 154 upon completion of the script at 420.

VNF manager can then check on the status of the cluster at 422 which PCRF 122 can provide 424. Finally, process 400 can conclude at step 426 with VNF manager 154 providing a status of the service to orchestrator 152.

Table 7 is another example of a custom (i.e., user-defined or non-native) policy "VPC_KEY_CYCLE" defining actions for a VNF manager to perform upon the VNF manager detecting a particular condition. For instance, the condition is a lifecycle stage of a VNF service (i.e., a virtual private cloud (VPC)), "LCS::CYCLE_60_SECONDS", that occurs every 60 seconds, and the action, "GEN_VPC_SSH_KEYS" includes executing a file named "vpc-di-internal-keys.exe." That is, every 60 seconds, the lifecycle manager executes a file to generate secure shell (SSH) keys for the VPC.

TABLE 7

Example of a custom lifecycle stage for a VPC.

```
 1: <policy>
 2:     <name>VPC_KEY_CYCLE </name>
 3:     <conditions>
 4:         <condition>
 5:             <name>LCS::CYCLE_60_SECONDS</name>
 6:         </condition>
 7:     </conditions>
 8:     <actions>
 9:         <action>
10:             <name>GEN_VPC_SSH_KEYS</name>
11:             <type> EXECUTABLE </type>
12:             <properties>
13:                 <property>
14:                     <name>executable_filename</name>
15:                     <value>vpc-di-internal-keys.exe</value>
16:                 </property>
17:             </properties>
18:         </action>
19:     </actions>
20: </policy>
```

Figure 5:
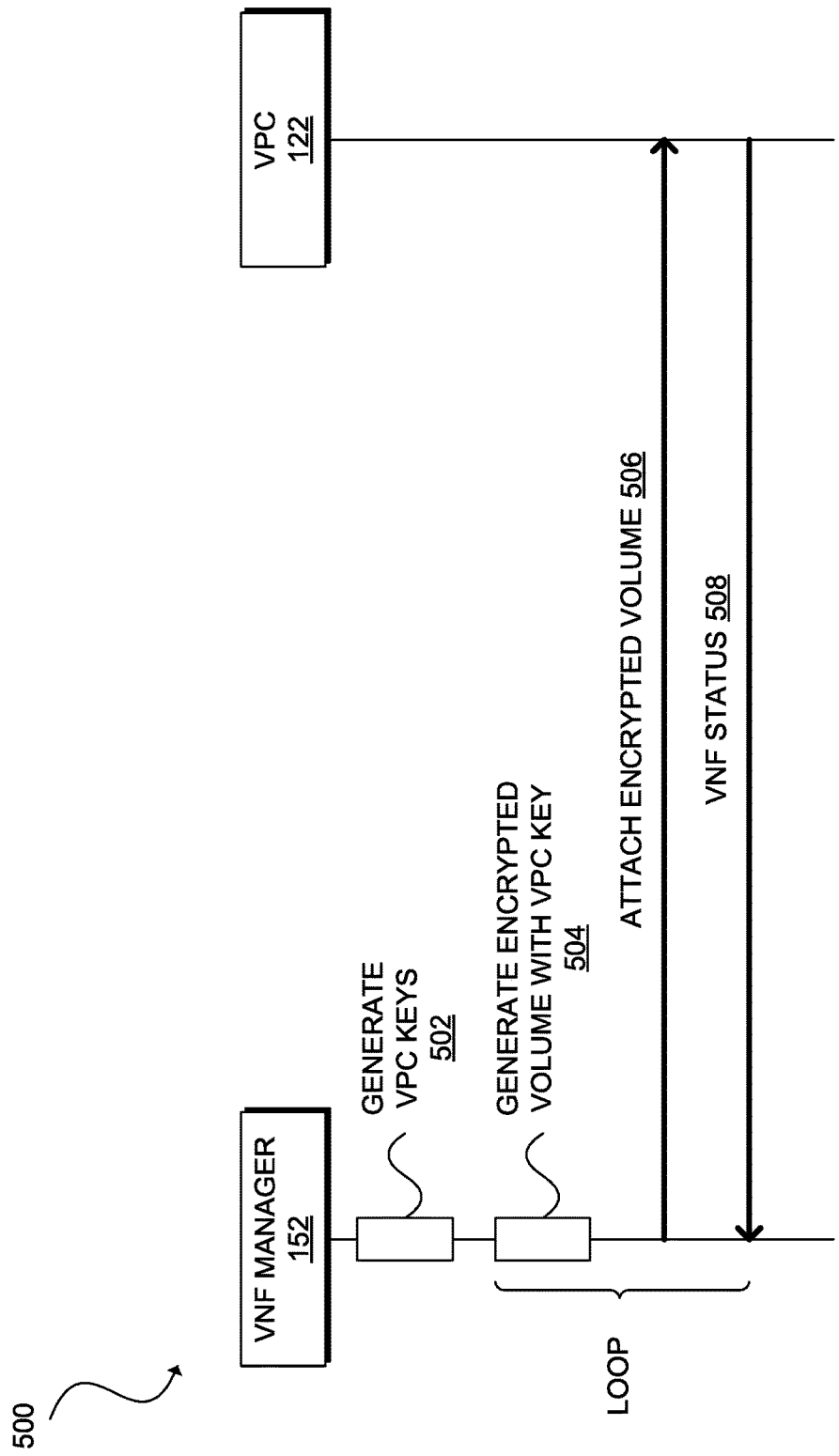
FIG. 5 illustrates another example of a sequence diagram of a process for customized orchestration of a VNF in accordance with various embodiments.

FIG. 5 illustrates a sequence diagram of a process 500 for customized orchestration of a VPC. The process can occur within an NFV platform similar to NFV platform 100, including VNF manager 154 and VPC 122. Process 400 can begin with VNF manager detecting a cyclic lifecycle stage for VPC 122, "LCS::CYCLE_60_SECONDS," representing a 60 second interval from VPC 122 previously being in this stage. At 502, VNF manager can perform an action associated with this lifecycle stage—executing a file to generate new set of keys for VPC 122. VNF manager can then generate an encrypted using one of the keys at 504, and update a VPC node by attaching the new encrypted volume. The VPC node can provide a status of the update at 508. Steps 504-508 can repeat for each VI instance of VPC 122.

Figure 6A:
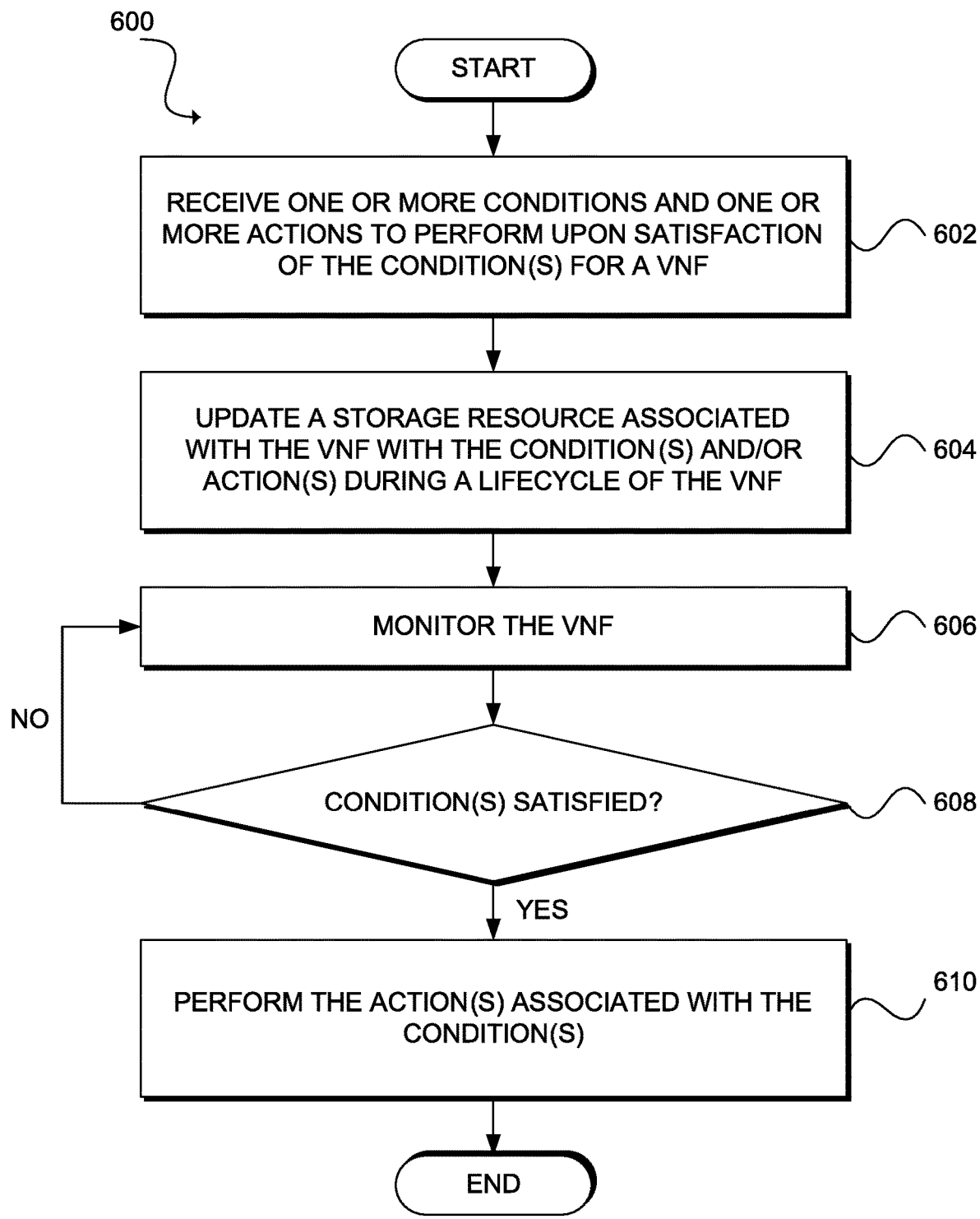
FIG. 6A illustrates an example of a process for dynamically changing the behavior of a VNF during its lifecycle in accordance with various embodiments.

FIG. 6A illustrates an example of process 600 for dynamically changing the behavior of a virtual network function during its lifecycle. A network or NFV platform (e.g., NFV platform 100) can perform process 600, and more particularly, a VNF manager (e.g., VNF manager 154 or VNF manager 200) or a lifecycle manager (e.g., lifecycle manager 220) of the VNF manager can perform process 600.

Process 600 can begin at step 602 in which a VNF manager of an NFV platform can receive a request to update one or more conditions of a VNF and/or one or more actions to perform on the VNF upon satisfaction of the condition(s). In some embodiments, the VNF manager can receive the request via a NETCONF API (e.g., NETCONF API 202), a REST API (e.g., REST API 204), web GUI (e.g., web GUI 206), or other suitable northbound (from the perspective of the VNF manager) interface. The VNF manager can receive the request, condition(s), and/or action(s) as XML, JSON, or other structured data, such as set forth in Tables 6 and 7.

In some embodiments, the VNF manager can support dynamic altering of the behavior of a VNF using a policy-driven data model. The VNF manager can define policies at the VNF and/or virtual infrastructure level. That is, the VNF manager can define policies for both VMs, containers, and/or other virtual partitions (i.e., VI instance) in addition to policies for a VNF service (comprising a single VNF or multiple VNFs). The policy data model can comprise conditions and actions, and include built-in or native conditions and actions and/or custom or user-defined conditions and actions. As discussed, conditions can include lifecycle states in a deployment. Actions can include scripts, source code, executable files, and the like. During the lifecycle of the VNF, the VNF manager can reference a storage resource or volume associated with the VNF (and/or a storage resource of its virtual infrastructure) to determine whether any conditions defined in the storage resource have occurred.

At step 604, while the VI instance/VNF instance is alive or running, the VNF manager can update a storage resource associated with the VI/VNF to include the new condition(s) and/or action(s). In some embodiments, the VNF manager can create a new storage volume that includes the new condition(s) and/or action(s), attach the new storage volume to the VI/VNF, and detach a previous storage volume. In other embodiments, the VNF manager can write the new condition(s) and/or action(s) to the existing storage volume of the VI/VNF.

At step 606, the VNF manager can monitor the VI/VNF, such as by a monitoring module of the VNF manager (e.g., monitoring module 226). For example, the VNF manager can determine the current lifecycle stage of the VI/VNF and retrieve any applicable policies for the current lifecycle stage from the updated policy data model. If, at 608, the VNF manager cannot detect satisfaction of any applicable conditions, the VNF can continue monitoring the VNF (i.e., return to step 606). However, if at 608, the VNF manager can determine satisfaction of the condition(s), the VNF manager can perform the action(s) associate with the condition(s) at step 610.

Figure 6B:
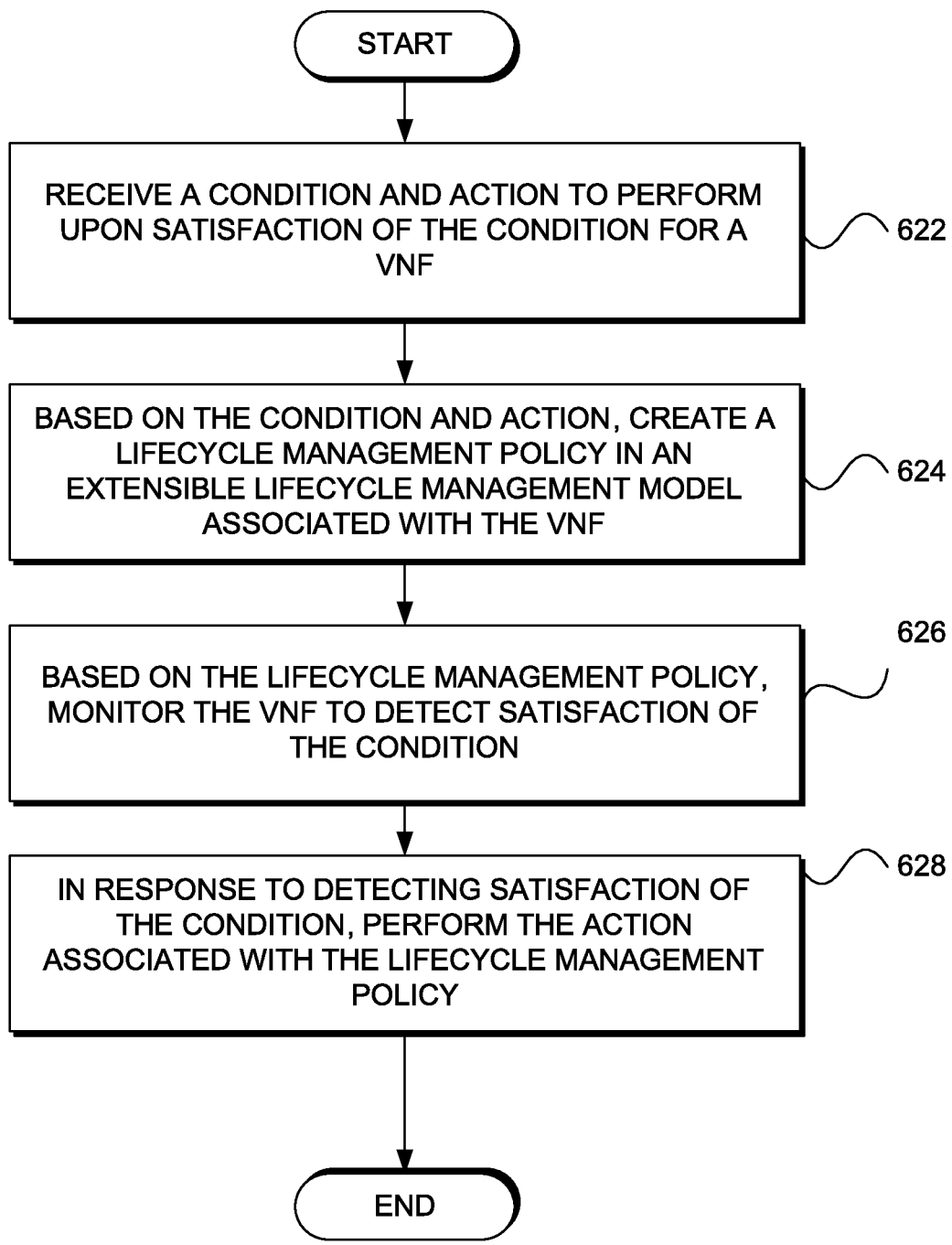
FIG. 6B illustrates an example method for dynamically customizing lifecycle management.

FIG. 6B illustrates an example method for dynamically customizing actions in a VNF lifecycle. At step 622, a VNF manager can receive a condition defining a lifecycle event associated with a VNF and an action to perform upon satisfaction of the condition. The action can be a custom action defined by a user and the condition can be a user-defined condition for triggering the custom action. Moreover, the custom action can be associated with a script or code provided to the VNF manager for executing the custom action. In some cases, the VNF can be part of a network service chain. The VNF can also be associated with one or more VNF infrastructure instances deployed in a network.

Based on the condition and action, at step 624, the VNF manager can create a lifecycle management policy in an extensible life cycle management model associated with the VNF. The lifecycle management policy can include the condition, the action, and/or one or more properties associated with the VNF or the lifecycle of the VNF. Based on the life cycle management policy, at step 626, the VNF manager can monitor the VNF to detect satisfaction of the condition. For example, the VNF manager can monitor events during the lifecycle of the VNF to determine if the condition has been satisfied.

In response to detecting satisfaction of the condition, at step 628, the VNF manager can perform the action associated with the lifecycle management policy. For example, the VNF manager can execute a script or code that performs the action defined in the lifecycle management policy. Thus, the condition can trigger the VNF manager to execute a custom action defined in the lifecycle management policy during any stage of the VNF's lifecycle.

Figure 7A:
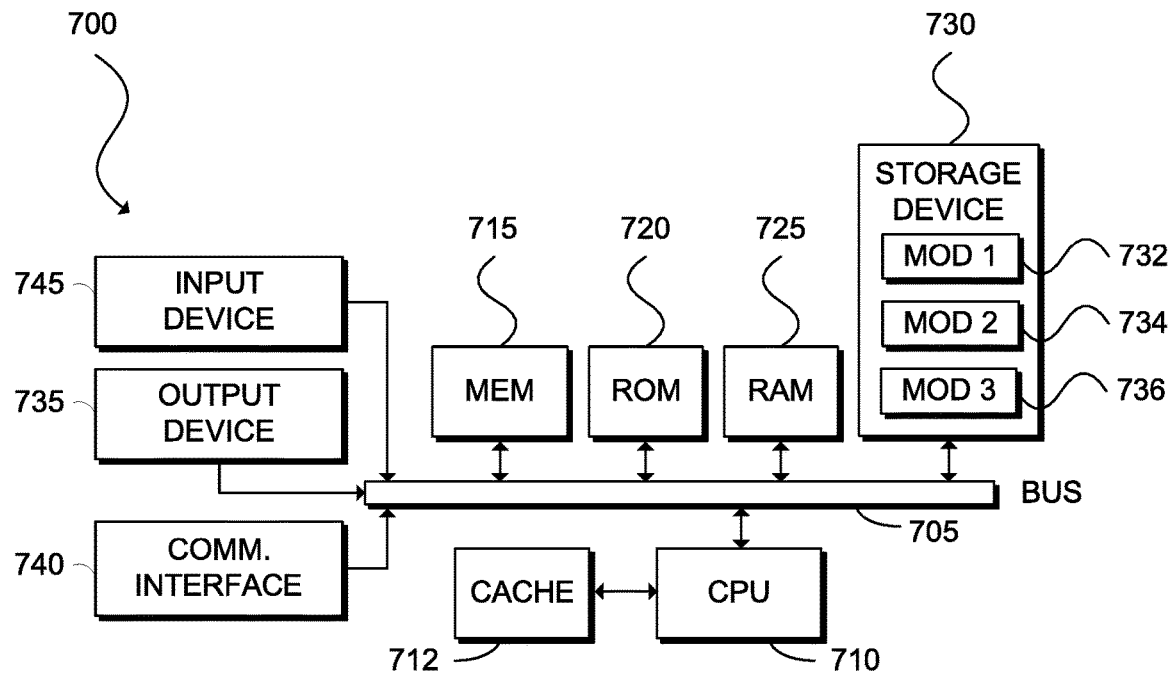
FIG. 7A and FIG. 7B illustrate examples of computing systems in accordance with various embodiments.

FIG. 7A illustrates an example of an architecture for a bus computing system 700. Computing system 700 can include central processing unit (CPU) 710 and system bus 705 that may couple various system components including system memory 715, memory (ROM) 720, and random access memory (RAM) 725, to CPU 710. Computing system 700 can include cache 712 of high-speed memory connected directly with, in close proximity to, or integrated as part of CPU 710. Computing system 700 can copy data from memory 715 and/or storage device 730 to cache 712 for quick access by CPU 710. In this way, cache 712 can provide a performance boost that avoids processor delays while waiting for data. These and other modules can control CPU 710 to perform various actions. Other system memory may be available for use as well. Memory 715 can include multiple different types of memory with different performance characteristics. CPU 710 can include any general purpose processor and a hardware module or software module configured to control CPU 710 as well as a special-purpose processor where software instructions are incorporated into the actual processor design. CPU 710 may essentially be a completely self-contained computing system, containing multiple cores or processors, a bus, memory controller, cache, etc. A multi-core processor may be symmetric or asymmetric.

To enable user interaction with computing system 700, input device 745 can represent any number of input mechanisms, such as a microphone for speech, a touch-protected screen for gesture or graphical input, keyboard, mouse, motion input, speech and so forth. Output device 735 can also be one or more of a number of output mechanisms known to those of skill in the art. In some instances, multimodal systems can enable a user to provide multiple types of input to communicate with computing system 700. Communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and hybrids thereof. Storage device 730 can include software modules 732, 734, 736 for controlling CPU 710.

In some embodiments, a computing system that performs a particular function can include the software component stored in a computer-readable medium in connection with the necessary hardware components, such as CPU 710, bus 705, output device 735, and so forth, to carry out the function.

Figure 7B:
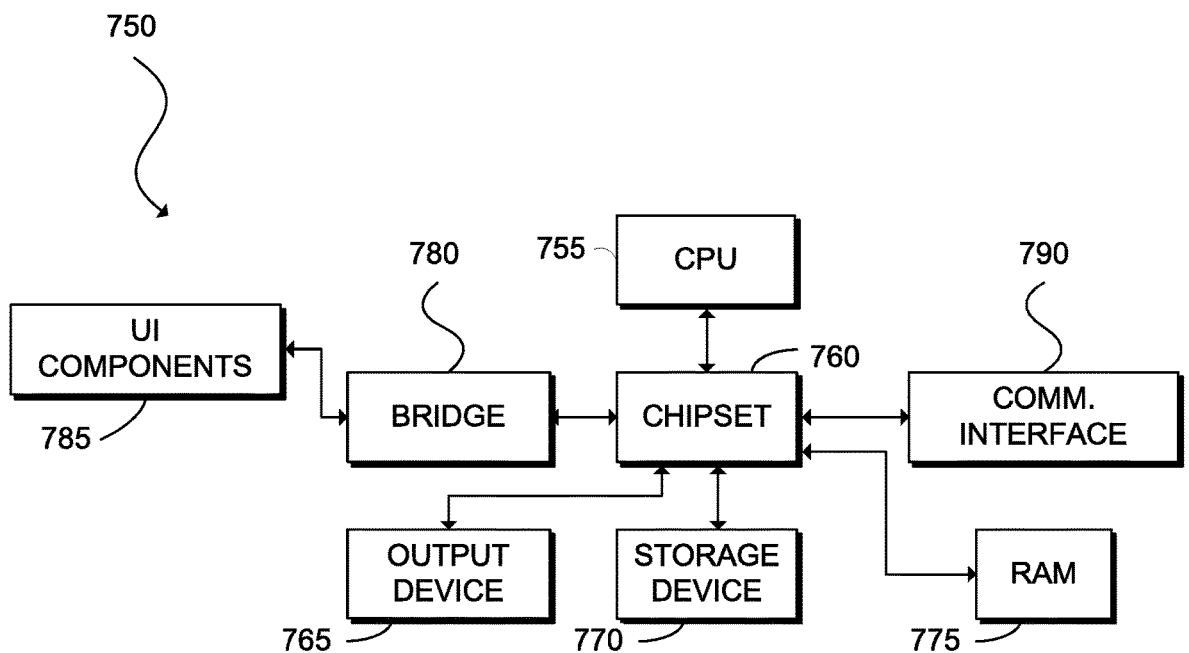

FIG. 7B illustrates an example of an architecture for chipset computing system 750. Computing system 750 can include CPU 755, representative of any number of physically and/or logically distinct resources capable of executing software, firmware, and hardware configured to perform identified computations. CPU 755 can communicate with chipset 760 to control input to and output from CPU 755. In this example, chipset 760 can output information to output device 765, such as a display, and can read and write information to storage device 770, which can be a hard disk drive (HDD), solid state drive (SSD), or a combination thereof (i.e., hybrid drive). Chipset 760 can also read data from and write data to RAM 775.

Computing system 750 can also include bridge 780 for interfacing with a variety of user interface components 785 and chipset 760. User interface components 785 can include a keyboard, a microphone, touch detection and processing circuitry, a pointing device, such as a mouse, and so on. Inputs to computing system 750 can come from any of a variety of sources, machine generated and/or human generated.

Chipset 760 can also interface with one or more communication interfaces 790 that can have different physical interfaces. Communication interfaces 790 can include interfaces for wired and wireless LANs, for broadband wireless networks, as well as personal area networks. Some applications of the methods for generating, displaying, and using user interfaces disclosed in the present disclosure can include receiving ordered datasets over the physical interface or generating the data by processor 755 analyzing data stored in storage device 770 or the RAM 775. Further, computing system 750 can receive inputs from a user via user interface components 785 and execute appropriate functions, such as browsing functions by interpreting these inputs using CPU 755.

One of ordinary skill in the art will appreciate that computing systems 700 and 750 can have more than one processor 710 and 755, respectively, or can be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described embodiment can reside within computer-executable instructions stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media used to store instructions, information used, and/or information created during methods according to described examples can include magnetic or optical disks, flash memory, USB devices provided with non-volatile memory, networked storage devices, and so on.

Devices implementing methods according to the present disclosure can comprise hardware, firmware, and/or software, and can take any of a variety of form factors. Typical examples of such form factors include laptops, smart phones, small form factor personal computers, personal digital assistants, rack-mount devices, standalone devices, and so on. Functionality described in the present disclosure can also reside in peripherals or add-in cards. Such functionality can also reside on a circuit board among different chips or different processes executing in a single device, by way of further example. The instructions, media for conveying such instructions, computing resources for executing them, and other structures for supporting such computing resources are means for providing the functions described in these disclosures.

Although a variety of examples and other information explain aspects within the scope of the appended claims, one of ordinary skill will understand not to imply any limitation based on particular features or arrangements in such examples, as one of ordinary skill would be able to use these examples to derive a wide variety of implementations. Further and although the present disclosure may describe some subject matter in language specific to examples of structural features and/or method steps, one of ordinary skill will understand that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A method comprising:
creating, at a virtual network function manager, a lifecycle management policy in an extensible lifecycle management data model associated with a virtual network function, the lifecycle management policy in the extensible lifecycle management data model comprising a condition defining a lifecycle event associated with the virtual network function and an action to perform during a specific lifecycle stage upon satisfaction of the condition;
based on the lifecycle management policy, monitoring the virtual network function to detect satisfaction of the condition; and
in response to detecting satisfaction of the condition, executing, based on the lifecycle management policy in the extensible lifecycle management data model, the action associated with the lifecycle management policy, wherein the action updates a copy of a storage volume associated with the virtual network function and uses the updated copy of the storage volume to alter the virtual network function without undeploying the virtual network function.

2. The method of claim 1, wherein executing the the action, comprises:
provisioning the copy of the storage volume;
assigning the updated copy of the storage volume to the virtual network function and unassigning the storage volume from the virtual network function.

3. The method of claim 2, wherein the storage volume comprises a current database volume of the virtual network function.

4. The method of claim 1, wherein the condition and the action are defined in a structured data format associated with the extensible lifecycle management data model, and wherein executing the action comprises executing a script or code that performs the action.

5. The method of claim 1, wherein the virtual network function is associated with a network function service chain, and wherein monitoring the virtual network function comprises monitoring events associated with the network function service chain.

6. The method of claim 1, wherein monitoring the virtual network function to detect satisfaction of the condition comprises:
    determining a current lifecycle stage of the virtual network function;
    based on the extensible lifecycle management data model, determining an applicable condition associated with the current lifecycle stage, wherein the applicable condition is the condition defining the lifecycle event associated with the virtual network function; and
    monitoring the virtual network function during the current lifecycle stage to determine satisfaction of the applicable condition.

7. The method of claim 1, wherein executing the action further comprises:
    determining that the virtual network function is associated with multiple virtual instances;
    determining that each of the multiple virtual instances has been deployed; and
    stitching the multiple virtual instances together as at least part of the action.

8. The method of claim 1, wherein executing the action further comprises:
    generating a set of keys as at least part of the action;
    provisioning a respective encrypted storage volume for each key of the set of keys; and
    attaching the respective encrypted storage volume to each virtual infrastructure instance of the virtual network function.

9. The method of claim 1, wherein the action alters a behavior of the virtual network function while the virtual network function is running.

10. The method of claim 1, further comprising loading a set of custom monitors defining one or more monitoring operations associated with the virtual network function.

11. A system comprising:
    one or more processors; and
    memory including instructions that, upon execution by the one or more processors, cause the system to:
        create, via a virtual network function manager, a lifecycle management policy in an extensible lifecycle management data model associated with a virtual network function, the lifecycle management policy in the extensible lifecycle management data model comprising a condition defining a lifecycle event associated with the virtual network function and an action to perform during a specific lifecycle stage upon satisfaction of the condition;
        based on the lifecycle management policy, monitor the virtual network function to detect satisfaction of the condition; and
        in response to detecting satisfaction of the condition, execute, based on the lifecycle management policy in the extensible lifecycle management data model, the action associated with the lifecycle management policy, wherein the action updates a copy of a storage volume associated with the virtual network function and uses the updated copy of the storage volume to alter the virtual network function without undeploying the virtual network function.

12. The system of claim 11, wherein the extensible lifecycle management data model defines characteristics of a lifecycle of the virtual network function, wherein the lifecycle includes at least one of an onboarding stage, a deployment stage, a monitoring stage, a scale stage, a heal stage, an update stage, and an undeployment stage, and wherein the lifecycle includes at least one custom lifecycle stage.

13. The system of claim 12, wherein the action alters a behavior of the virtual network function while the virtual network function is running.

14. The system of claim 11, wherein executing the action further comprises
    determining that the virtual network function is associated with multiple virtual instances;
    determining that each of the multiple virtual instances has been deployed; and
    stitching the multiple virtual instances together as at least part of the action.

15. The system of claim 11, wherein executing the action further comprises:
    generating a set of keys as at least part of the action;
    provisioning a respective encrypted storage volume for each key of the set of keys; and
    attaching the respective encrypted storage volume to each virtual infrastructure instance of the virtual network function.

16. A non-transitory computer-readable medium having instructions that, upon being executed by one or more processors, cause the one or more processors to:
    create, via a virtual network function manager, a life cycle management policy in an extensible life cycle management data model associated with a virtual network function, the lifecycle management policy in the extensible lifecycle management data model comprising a condition defining a lifecycle event associated with the virtual network function and an action to perform during a specific lifecycle stage upon satisfaction of the condition;
    based on the life cycle management policy, monitor the virtual network function to detect satisfaction of the condition; and
    in response to detecting satisfaction of the condition, execute, based on the lifecycle management policy in the extensible lifecycle management data model, the action associated with the lifecycle management policy, wherein the action updates a copy of a storage volume associated with the virtual network function and uses the updated copy of the storage volume to alter the virtual network function without undeploying the virtual network function.

17. The non-transitory computer-readable medium of claim 16, wherein comprises:
    provisioning the copy of the storage volume;
    assigning the updated copy of the storage volume to the virtual network function and unassigning the storage volume from the virtual network function.

18. The non-transitory computer-readable medium of claim 16, wherein the storage volume comprises a current database volume of the virtual network function.

19. The non-transitory computer-readable medium of claim 16, wherein the action is associated with at least one of an interpreted script or an executable file.

20. The non-transitory computer-readable medium of claim 16, wherein monitoring the virtual network function to detect satisfaction of the condition comprises:

determining a current lifecycle stage of the virtual network function;

determining an applicable condition associated with the current lifecycle stage, wherein the applicable condition is the condition defining the lifecycle event associated with the virtual network function; and monitoring one or more events in the current lifecycle stage to detect satisfaction of the applicable condition.

\* \* \* \* \*